(12) United States Patent
Gibbons

(10) Patent No.: US 8,858,087 B2
(45) Date of Patent: Oct. 14, 2014

(54) BEARING ASSEMBLY

(71) Applicant: Rolls-Royce PLC, London (GB)

(72) Inventor: John Leslie Gibbons, Gloucester (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 13/741,704

(22) Filed: Jan. 15, 2013

(65) Prior Publication Data

US 2013/0195392 A1    Aug. 1, 2013

(30) Foreign Application Priority Data

Jan. 30, 2012   (GB) .................................. 1201498.1

(51) Int. Cl.
*F16C 33/62* (2006.01)
*F02C 7/06* (2006.01)
*F16C 25/06* (2006.01)

(52) U.S. Cl.
CPC . *F02C 7/06* (2013.01); *F16C 33/62* (2013.01); *F16C 25/06* (2013.01)
USPC ...................................................... 384/492

(58) Field of Classification Search
CPC ...... F11C 33/32; F11C 33/62; F11C 2229/00; F11C 2240/14; F11C 2240/70
USPC .................. 384/492, 450, 513, 516
See application file for complete search history.

(56) References Cited

U.S. PATENT DOCUMENTS

| | | | | |
|---|---|---|---|---|
| 3,307,891 A | * | 3/1967 | Carullo | 384/569 |
| 4,548,518 A | * | 10/1985 | Ravinale et al. | 384/490 |
| 4,718,781 A | * | 1/1988 | Gerard | 384/495 |
| 5,086,560 A | * | 2/1992 | Glazier | 384/548 |
| 5,102,241 A | * | 4/1992 | Pflungner | 384/499 |
| 5,228,786 A | * | 7/1993 | Tanimoto et al. | 384/492 |
| 6,129,454 A | | 10/2000 | Obara | |
| 6,142,674 A | * | 11/2000 | Bayer | 384/482 |
| 6,158,896 A | * | 12/2000 | Zernickel et al. | 384/506 |
| 6,261,061 B1 | * | 7/2001 | Pfaffenberger | 415/229 |
| 7,186,029 B2 | * | 3/2007 | Takei et al. | 384/450 |
| 2013/0108202 A1 | * | 5/2013 | Do et al. | 384/572 |

FOREIGN PATENT DOCUMENTS

CN    100449162 C    1/2009
JP    A-2003-343569   12/2003

OTHER PUBLICATIONS

British Search Report issued in British Application No. 1201498.1 dated May 29, 2012.

* cited by examiner

*Primary Examiner* — Thomas R. Hannon
(74) *Attorney, Agent, or Firm* — Oliff PLC

(57) ABSTRACT

A bearing assembly that includes a substantially circular bearing race with a raceway on one of its radially inner or outer surfaces and a plurality of spherical bearing elements disposed around the raceway, and wherein the bearing race is configured to, in use, bias the bearing elements towards a bearing region of a shaft.

17 Claims, 5 Drawing Sheets

BEARING ASSEMBLY

This invention claims the benefit of UK Patent Application No. 1201498.1, filed on 30 Jan. 2012, which is hereby incorporated herein in its entirety.

FIELD OF THE INVENTION

The present disclosure relates to a bearing assembly.

BACKGROUND TO THE INVENTION

In a gas turbine engine each main shaft must be located by at least two bearing assemblies. One may comprise ball bearing elements 10 carried between an inner raceway 12 and an outer raceway 14, with a cage 16 separating the bearings, where the cage rotates with the ball bearings, for example as shown in FIG. 1. Such bearing assemblies are able to take axial and radial loads. The other bearing assembly of the pair may comprise roller bearing elements 20 with an outer raceway 24 and cage 26, with the roller elements 20 bearing directly onto a shaft 28 they support, for example as shown in FIG. 2. The roller bearing withstands radial loads but permits the shaft to move axially without impediment so that thermal expansions can be accommodated. The region of the shaft upon which the bearing runs may be hardened, for example by a heat treatment or other technique for altering the material properties of the shaft material in that region.

In such an arrangement, engine design normally dictates that the ball bearing arrangement (i.e. the FIG. 1 example) that resists the axial and radial loads is in a relatively cool region for example, in the compressor region of a gas turbine engine) so as to limit thermal expansion and contraction and thereby limit thermo-mechanical loads on the bearing assembly. Since the roller bearing is less constrained axially, and hence better able to cope with thermo-mechanical loads induced by thermal expansion and contraction, the roller bearing tends to be located within the relatively hotter turbine region.

It is difficult to deliver and scavenge (i.e. remove) oil to the turbine region for lubrication and cooling because of build constraints and operating temperature of the turbine. Often, whilst the supply of oil can be maintained the scavenge is badly affected by thermal degradation of the oil.

Hybrid ball bearings are in use in machine-tool ball bearings where the low weight and high stiffness make the balls ideal for high speeds and low heat generation. "Hybrid" is a term used within the bearing industry to identify a bearing with metal or steel inner and outer raceways that uses ceramic rolling elements.

Hybrid roller bearings (i.e. bearings with a metal outer race and ceramic roller bearing) are expensive and difficult to manufacture. Both the roller bearings and the required cage require complex machining. In operation, although roller bearings under high speeds need little in the way of lubrication for the rolling of the rollers, it is necessary for the rollers to be guided by ribs 18, where the ribs for a roller bearing require a significant amount of lubrication.

Also the cooling of the bearing assembly within the turbine structure aggravates thermal stresses within the bearing assembly. The outer raceway is in contact with metal washed by hot gasses, which makes the outer raceway of the bearing structure hot. Conversely the inner raceway of the bearing structure is maintained at a relatively low temperature by the bearing lubricating oil and because it is in contact with a relatively cool structure. Thus any of the bearing assemblies described above will suffer considerable thermal mechanical stress because of the thermal gradient across them. Additionally, the wide range of temperatures experienced by the bearing assembly means that the outer bearing race will expand and contract relative to the inner bearing race (where present), the caged bearing elements and the shaft they support. Thus under some temperature conditions and thermal gradients, and with respect to the example shown in FIG. 1 above, the ball elements may not be in contact with, or may only lightly touch, the inner race. Likewise, with respect to the example shown in FIG. 2 above, the roller elements may not be in contact with, or may only lightly touch, the shaft under some temperature conditions and thermal gradients. Thus the bearing elements in both examples may skid (i.e. not achieve their epicyclic speed) and thus slide on the surface of the race and/or shaft, increasing frictional losses and increasing wear on the element, race and/or shaft, and thus reducing the operation life of the arrangement.

Hence a bearing assembly which is relatively simple and cheap to manufacture, which is operable in a high temperature environment, has a low lubrication requirement and is tolerant of high temperature gradients, is highly desirable.

STATEMENTS OF INVENTION

Accordingly there is provided a bearing assembly comprising: a substantially circular bearing race with a raceway on one of its radially inner or outer surfaces; a plurality of spherical bearing elements disposed around the raceway; the bearing race being configured to, in use, bias the bearing elements towards a bearing region of a shaft.

The bearing assembly may further comprise a shaft, the bearing race being configured to bias the bearing elements towards the shaft with sufficient load to maintain contact between the bearing elements and the shaft throughout a predetermined range of operational conditions.

There is thus provided a bearing assembly with a biased race which will ensure that the bearing elements are in contact with the shaft under all load conditions. This reduces the likelihood of bearing skid and provides a means to maximise operational life of the assembly. Since the bearing assembly comprises only a single race, relative axial movement between the bearing assembly and the shaft may be easily accommodated. Hence the bearing assembly is tolerant both of high temperature locations and locations in which the large fluctuating temperature gradient is applied across the bearing assembly.

Other aspects of the invention provide devices, methods and systems which include and/or implement some or all of the actions described herein. The illustrative aspects of the invention are designed to solve one or more of the problems herein described and/or one or more other problems not discussed.

BRIEF DESCRIPTION OF THE DRAWINGS

Examples of the present disclosure will now be described with reference to the accompanying drawings, in which.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

Figure 1:
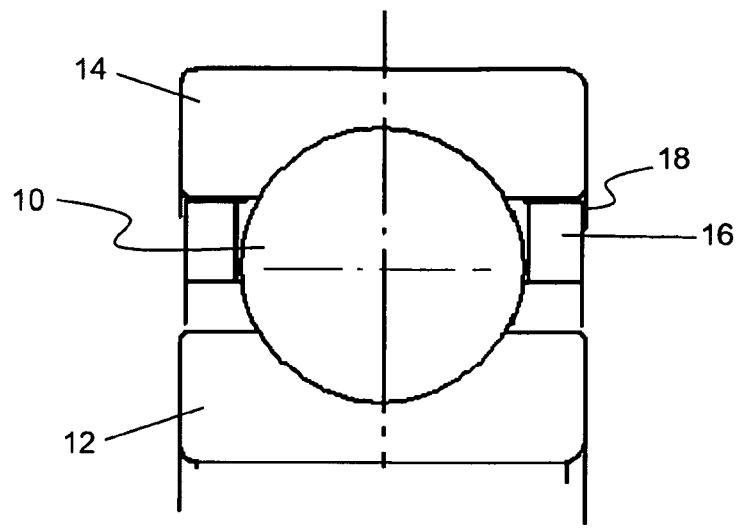
FIG. 1 shows a known spherical bearing arrangement.
Figure 2:
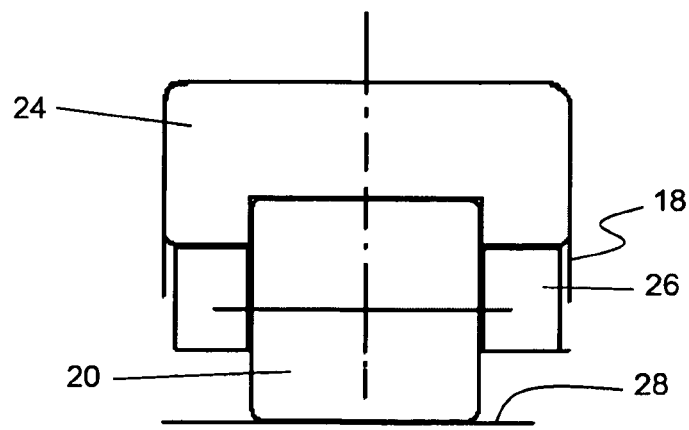
FIG. 2 shows a known roller bearing arrangement.
Figure 3:
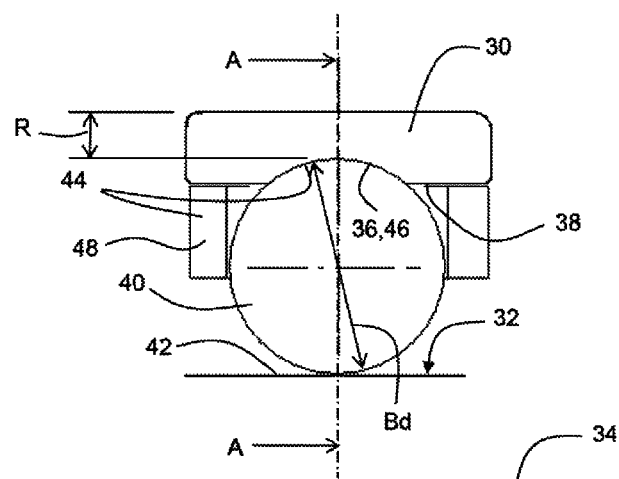
FIG. 3 shows an example of a bearing assembly having a single radially biased race, the bearings being in direct contact with a bearing region on a shaft, and a bearing retention means provided as part of the race.
Figure 4:
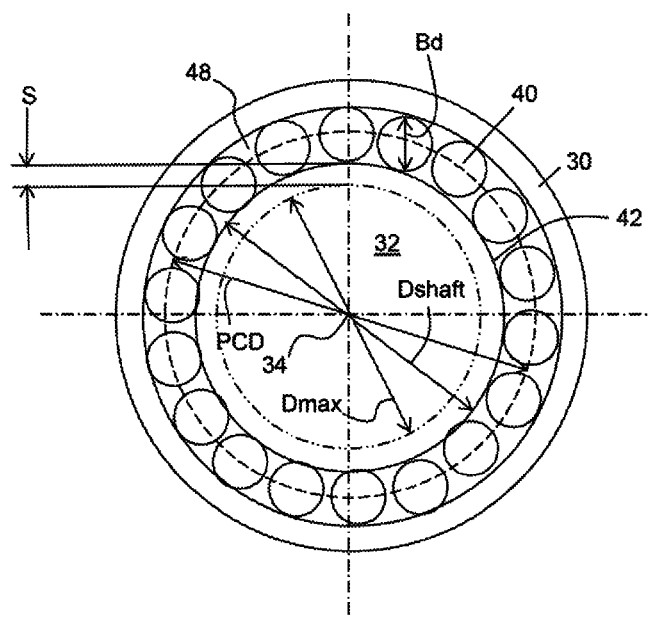
FIG. 4 shows a cross sectional view through line AA in FIG. 3.

FIG. 3, FIG. 4, FIG. 5, FIG. 6, FIG. 7 and FIG. 8 show examples of bearing assemblies according to the present disclosure. FIG. 3, FIG. 5, FIG. 6 and FIG. 7 show cross sections through one of a number of spherical bearing elements disposed on a cylindrical race. FIG. 4 shows a cross section through line AA in FIG. 3. In practice the bearing assemblies may also comprise a housing which surround the bearing elements and race. However, for clarity, the housing has been omitted from the drawings.

Figure 8:
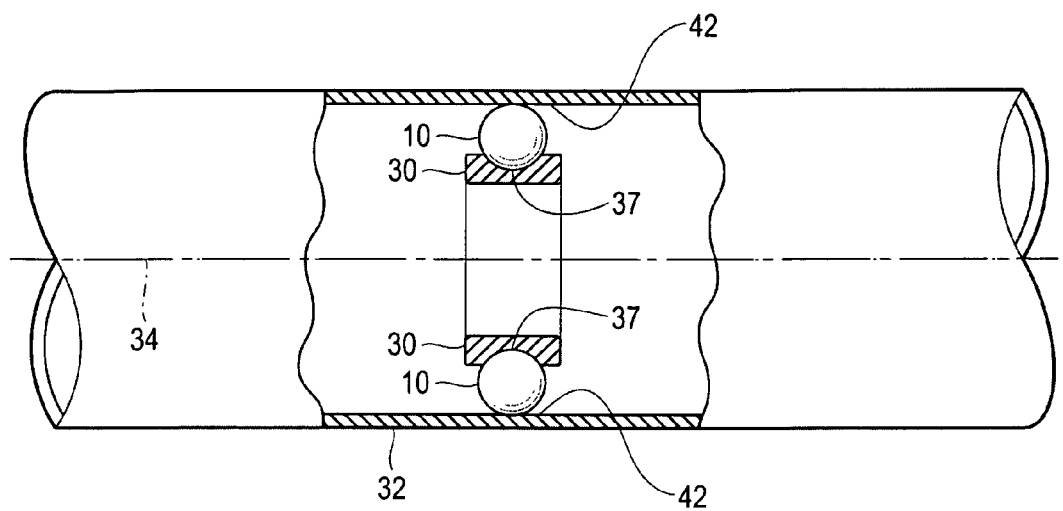
FIG. 8 shows an embodiment with the bearing race with a raceway on one of its radially outer surfaces.

FIG. 3 and FIG. 4 show a substantially circular (i.e. ring shaped) bearing race 30 disposed around a shaft 32. The shaft 32 has a centreline 34 which defines the rotational axis of the bearing. For the avoidance of doubt, in this specification, the terms "radial" and "axial" are defined with respect to the radius of the bearing and the rotational axis of the bearing unless otherwise specified. The race 30 is provided with a raceway 36 on one of its radially inner or outer surfaces. In the examples shown the raceway 36 is provided on the radially inner surface 38 of the race 30. FIG. 8 shows the raceway provided on the radially outer surface 37 of the race 30. A plurality of spherical bearing elements 40 of diameter "Bd" are disposed around the raceway 36 such that the bearing elements 40 have a Pitch Circle Diameter "PCD". The shaft 32 has a bearing region 42 which is in contact with the bearing elements 40. The bearing race 30 is configured to bias the bearing elements 34 towards the shaft 32.

In the example shown, the shaft has a maximum bore (internal diameter), Dmax, and the shaft bearing region 42 has maximum diameter, Dshaft. The shaft thickness S may be about half the bearing diameter Bd. Hence the bore of the shaft Dmax may be equal to (Dshaft−Bd). It may be necessary to have a larger value of S than this in order to diffuse Hertzian contact stresses induced by the bearing element in use, and also to withstand induced bending and shear stresses. Alternatively, or additionally, the shaft thickness may be a function of the torque to be transmitted by the shaft.

The minimum internal diameter defined by the bearing elements may be less than the maximum diameter of the shaft bearing region Dshaft. The term "minimum internal diameter" is taken to mean the diameter of the circle defined by the radially most inner point on the bearing elements 40 when disposed in the bearing race 30, as shown in FIG. 4. The minimum internal diameter defined by the bearing elements may be at least 80% of the ball diameter (Bd) less than the maximum diameter of the shaft bearing region Dshaft. Dshaft may be cylindrically extended to enable the shaft to be free of the minimum internal diameter. The difference between Dshaft and the internal diameter defined by the bearing elements may be chosen such that there is a running clearance.

Alternatively the difference between Dshaft and the internal diameter defined by the bearing elements may be chosen such that a dimensional radial interference is applied by virtue of the race 30 and bearing element 40 elasticity. The radial interference may be about 0.100 mm.

In an alternative example shown in FIG. 8 the bearing raceway 36 is on the radially outer surface 37 of the race 30 and the maximum external diameter, Dmax defined by the bearing elements 40 is at least 20% of the ball diameter (Bd) more than the minimum internal diameter Dshaft of the shaft bearing region 42, but no more than 80% of the ball diameter (Bd) more than the minimum internal diameter Dshaft of the shaft bearing region 42.

The values of Dshaft, ball diameter (Bd) and raceway 36 diameter are chosen to achieve an interference between the shaft and bearing elements of substantially PCD/1000, for example 0.100 mm. The thickness of the race 30 is chosen to allow the raceway to stretch to a certain degree, and hence maintain a preload on the bearing elements which is sufficient to prevent the bearing elements skidding, but low enough to maintain stress induced on the bearing elements to a predetermined level, for example less than 20% of the yield stress of the material of the outer ring or a sustainable Hertzian contact stress of the bearing elements.

The radial preload value is dependent upon bearing size and expected rotational speed. Oil lubricated high speed bearings can suffer considerable drag due to the resistance of the cage and balls travelling through an oil laden atmosphere. Hence the total radial preload may be about 1000 N force to ensure epicyclic rolling of the rolling elements. The bearing assembly of the present disclosure is configured to share the preload substantially equally between all rolling elements.

The bearing race 30 is radially resilient. That is to say the bearing assembly is configured to accommodate radial displacements which may either increase or decrease its diameter, the change in diameter resulting in the race being biased in an opposite direction to the radial displacement. In the example shown in FIG. 3 and FIG. 4 the bearing race 30 prior to being fitted around the shaft 32 has a first diameter. During fitting to the shaft, the bearing race 30 experiences a radial force because of the chosen interference between the shaft and bearing elements, and thus changes in diameter. Hence after being fitted to the shaft, the bearing race 30 has a second diameter, where the second diameter is greater than the first diameter. The resilience of the race 30 results in the bearing race 30 being biased radially inwards, thereby applying a load to the bearing elements 40. The difference in diameter is chosen to ensure that the bearing elements 40 are biased towards the shaft 32 with sufficient load to maintain contact between the bearing elements 40 and the shaft 32 throughout a predetermined range of operational conditions.

At least one bearing retention means 44 is provided on either the shaft 32 or race 30 to prevent axial movement of the bearing elements 40 relative to whichever of the shaft 32 or race 30 the bearing retention means 44 is provided. The bearing element 40 is free to move in an axial direction relative to whichever of the shaft 32 or outer race 30 is not provided with a bearing retention means 44. In the examples shown in FIG. 3, FIG. 4, FIG. 5 and FIG. 6 the bearing retention means 44 is provided on the race 30. In the example shown in FIG. 7 the bearing retention means 44 is provided on the shaft 32.

The bearing retention means 44 comprises a track 46 sized to accommodate the bearing element 40. The track 46 is concavely curved and has a depth of no greater than 15% of the diameter (Bd) of the bearing element 40. The track may have a depth of no less than 10% of the diameter of the bearing element 40. The thinnest part of the race 30 at the apex of the track 46 may be about 0.18 Bd. The thickest part of the race 30 may be about 0.28 Bd.

The bearing retention means 44 may also comprise a cage 48 which extends from whichever of the shaft 32 or race 30 the bearing retention means is provided. In the example shown in FIG. 3 the cage 48 extends from the race 30. The cage 48 is shown as a dotted line in FIG. 4. In the example shown in FIG. 7 the cage 48 extends from the shaft 32. Also in FIG. 7 the race 30 is substantially thinner than in the preceding examples, having a thickness of in the range of about 0.1 Bd to 0.2 Bd. Hence the dimensional interference of the example of FIG. 7 may be doubled for a given level of preload. This is advantageous since it means the manufacturing tolerances of the race 30 of the example of FIG. 7 example may be twice that of the example shown in FIG. 5, making it easier to manufacture.

The bearing elements 40 comprise a ceramic material, for example Silicon Nitride. The race 30 may comprise a substantially metallic material such as, for example, hardened steels, case hardened steels, Carbon-Chrome Materials such as EN31, BS S135, BS S136, DIN 100Cr6, SAE52100 and AMS 6491; or Carburising Materials such as BS S82, BS S156, SAE9310 and AMS6278; or Nitriding Materials such as BS S106, BS S132, AIR 32CDV13 and AMS6481. Alternatively an engineering ceramic monoliths and composite may be used. The cage 48 may comprise a polymers, reinforced polymers, metal alloy, Carbon Graphite and composites. Alternatively the cage may be made from brass, bronze or steel.

Figure 5:
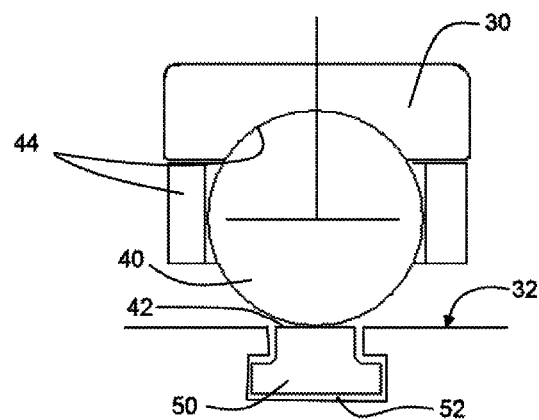
FIG. 5 shows an example of a bearing assembly similar to that shown in FIG. 3, but provided with a ceramic ring as a bearing region.

Shown in FIG. 5 is an alternative example of a bearing assembly according to the present disclosure. The details of the race 30, bearing retention means 44 and bearing element 40 are as that shown in FIG. 3 and FIG. 4. However, in this example the bearing region 42 is provided as a radially outer surface of a ring 50, where the ring 50 is radially adjacent and in contact with the bearing elements 40. The ring may be made from a ceramic, for example Silicon Nitride. The ring 50 is disposed around the shaft 32, and may be manufactured independently of the shaft 32. In FIG. 5 the ring 50 is shown disposed in a groove (or "recess") 52 in the shaft 32. However, it may also be provided on the outer circumference of the shaft 32.

Figure 6:
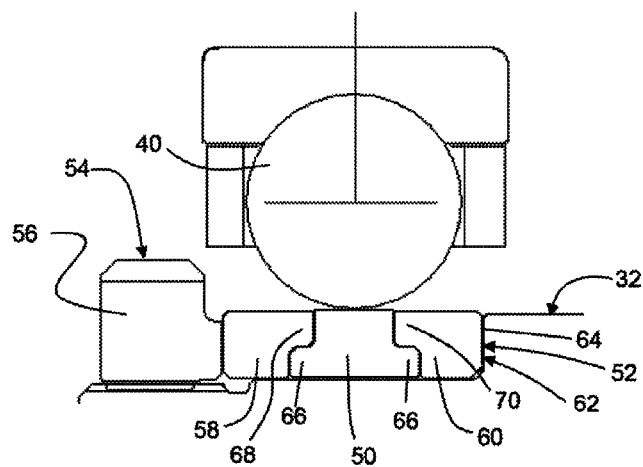
FIG. 6 shows an example similar to that of FIG. 4 with the addition of a clamp to provide a compressive force on the ceramic ring.
Figure 7:
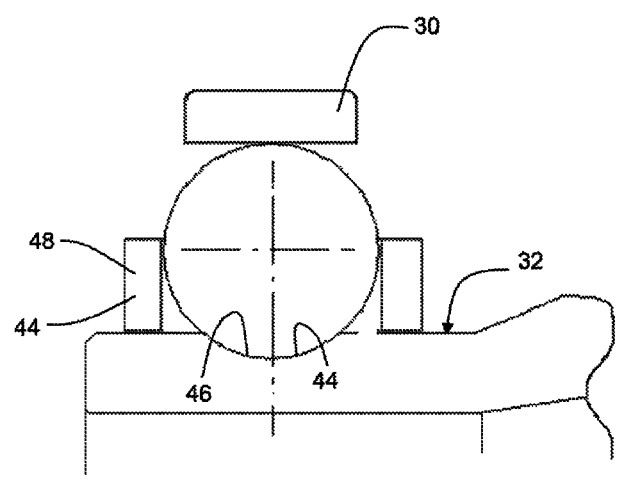
FIG. 7 shows an alternative example with a bearing retention means provided on the shaft.

An alternative example is shown in FIG. 6. The example shown has many features in common with that shown in FIG. 5, except that it contains an additional feature of a clamp 54 which is provided to provide a compressive load on the ceramic ring 50 in an axial direction. As in the previous example, the ceramic ring 50 is located in a recess 52 in the shaft 32. The clamp 54 comprises a compression ring 56 which reacts a load against the shaft 32 to provide a compressive load on the ceramic ring 50. In the example shown the compression ring 56 comprises a ring-nut.

The clamp 54 further comprises a first jaw member 58 disposed between the compression ring and ceramic ring. The clamp 54 further comprises a second jaw member 60 disposed between the ceramic ring 50 and an abutment feature 62 provided on the shaft 32. In this example the abutment feature 62 is a shoulder 64 which defines an edge of the recess 52. The ceramic ring 50 is provided with an annular flange 66 on a radial side adjacent the shaft 32, and the first 58 and second 60 jaw members comprise complementary flanges 68,70 which overlap the ceramic ring flanges 66 in an axial direction.

The jaw members 58,60 may be attached to the ceramic ring 50 in manufacture, with a precursor to the final assembly having the ring and jaw members proud of the adjacent shaft material. The surface of the ring and jaw members, and perhaps the shaft, may then be ground together to produce a substantially flush surface and shaft bearing region.

The bearing assembly may be employed in any application where rotatable motion and support is to be achieved. The bearing assembly has particular efficacy in high temperature applications, and especially where there is a large thermal fluctuation of thermal gradient across the bearing assembly, for example a turbine section of a gas turbine engine.

The device of the present disclosure provides the significant advantage that, due to the resilience and radial preloading of the race 30, the bearing elements 40 are maintained in contact with the shaft bearing region under all expected and/or normal operation conditions, thereby reducing the likelihood of bearing skid. As described above, the preload is applied having a radial interference between the bearing elements 40 and the bearing region 42 of the shaft 32. The device of the present disclosure comprises spherical ball bearing elements, which during assembly, may be pushed and roll over the surface of the shaft 32 relatively easily to reach their desired location on the bearing region 42 of the shaft.

Since the bearing assembly comprises only a single race, relative axial movement between the bearing assembly and the shaft may be easily accommodated. Although it is appreciated roller bearing arrangements are known with only a single outer race, which are also therefore tolerant of relative axial movement, such arrangements are significantly more complicated to manufacture and have a higher lubrication requirement than the device of the present disclosure.

Ceramic spherical bearing elements are lighter than their equivalents made from metal, and therefore, in use, have less momentum and are hence better for high speed applications.

Although the examples presented in the Figures all show a bearing region which extends in an axial direction with parallel sides, the inclusion of a spherical ball bearing results in the arrangement of the present disclosure being tolerant of tapered shafts without the requirement for extra lubrication that a roller bearing would in an equivalent application. This is especially advantageous as it is often the case that, in use, a plane cylindrical bearing region or raceway becomes tapered due to thermal gradients or due to centrifugal expansions. Hence the device of the present disclosure may provide greater longevity than previously known bearing arrangements.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person of skill in the art are included within the scope of the invention as defined by the accompanying claims.

What is claimed is:

1. A bearing assembly comprising:
   a substantially circular bearing race with a raceway on its radially inner surface;
   a plurality of spherical bearing elements disposed around the raceway;
   the bearing race being configured to, in use, bias the bearing elements towards a bearing region of a shaft with sufficient load to maintain contact between the bearing elements and the shaft throughout a predetermined range of operational conditions, the bearing region of the shaft being provided as a ceramic ring radially adjacent and in contact with each bearing element, and the ceramic ring being disposed in a recess provided in the shaft.

2. A bearing assembly as claimed in claim 1 wherein the minimum internal diameter defined by the bearing elements is at least 80% of the diameter of the bearing elements less than the maximum diameter of the shaft bearing region.

3. A bearing assembly as claimed in claim 1 wherein the bearing race is radially resilient.

4. A bearing assembly as claimed in claim 1 wherein
at least one bearing retention means is provided on either the shaft or race to prevent axial movement of the bearing element relative to whichever of the shaft or race the bearing retention means is provided;
the bearing element being free to move in an axial direction relative to whichever of the shaft or race is not provided with a bearing retention means.

5. A bearing assembly as claimed in claim 4 wherein the bearing retention means comprises a track sized to accommodate the bearing element.

6. A bearing assembly as claimed in claim 5 wherein the track is concavely curved and has a depth of no greater than 15% of the diameter of the bearing element.

7. A bearing assembly as claimed in claim 5 wherein the track is concavely curved and has a depth of no less than 10% and no greater than 15% of the diameter of the bearing element.

8. A bearing assembly as claimed in claim 4 wherein the bearing retention means comprises a cage which extends from whichever of the shaft or race the bearing retention means is provided.

9. A bearing assembly as claimed in claim 1 wherein each bearing element comprises a ceramic material.

10. A bearing assembly as claimed in claim 1 wherein a clamp is provided to provide a compressive load on the ceramic ring in an axial direction.

11. A bearing assembly as claimed in claim 10 wherein the clamp comprises a compression ring which reacts a load against the shaft to provide a compressive load on the ceramic ring.

12. A bearing assembly as claimed in claim 11 wherein the clamp further comprises a first jaw member disposed between the compression ring and ceramic ring.

13. A bearing assembly as claimed in claim 12 wherein the clamp further comprises a second jaw member disposed between the ceramic ring and an abutment feature provided on the shaft.

14. A bearing assembly as claimed in claim 13 wherein the ceramic ring is provided with an annular flange on a radial side adjacent the shaft, and the first and second jaw members comprise complementary flanges which overlap the ceramic ring flange in an axial direction.

15. A bearing assembly as claimed in claim 10 wherein the clamp further comprises an abutment feature, the abutment feature comprising a shoulder which defines an edge of the recess.

16. A bearing assembly comprising:
a substantially circular bearing race with a raceway on its radially outer surface;
a plurality of spherical bearing elements disposed around the raceway;
the bearing race being configured to, in use, bias the bearing elements towards a bearing region of a hollow shaft with sufficient load to maintain contact between the bearing elements and the shaft throughout a predetermined range of operational conditions, the bearing region of the shaft being provided as a ceramic ring radially adjacent and in contact with each bearing element, and the ceramic ring being disposed in a recess provided in the shaft.

17. A bearing assembly as claimed in claim 16 wherein the maximum external diameter defined by the bearing elements is at least 20% of the diameter of the bearing elements more than the minimum internal diameter of the shaft bearing region, but no more than 80% of the diameter of the bearing elements more than the minimum internal diameter of the shaft bearing region.

* * * * *